United States Patent
Provost et al.

(10) Patent No.: US 10,738,758 B2
(45) Date of Patent: Aug. 11, 2020

(54) FUNNEL WIND TURBINE

(71) Applicant: MJ Stewart Investments, LLC, Washington, UT (US)

(72) Inventors: Wayne A. Provost, St. George, UT (US); Jeffrey Stewart, Washington, UT (US)

(73) Assignee: MJ Stewart Investments, LLC, St. George, UT (US)

( * ) Notice: Subject to any disclaimer, the term of this patent is extended or adjusted under 35 U.S.C. 154(b) by 0 days.

(21) Appl. No.: 16/371,337

(22) Filed: Apr. 1, 2019

(65) Prior Publication Data

US 2020/0003175 A1     Jan. 2, 2020

Related U.S. Application Data

(63) Continuation-in-part of application No. 16/024,173, filed on Jun. 29, 2018.

(51) Int. Cl.
*F03D 1/04* (2006.01)
*H02S 10/12* (2014.01)

(52) U.S. Cl.
CPC ............... *F03D 1/04* (2013.01); *H02S 10/12* (2014.12); *F05B 2220/708* (2013.01); *F05B 2240/12* (2013.01); *F05B 2240/133* (2013.01)

(58) Field of Classification Search
None
See application file for complete search history.

(56) References Cited

U.S. PATENT DOCUMENTS

| | | | | |
|---|---|---|---|---|
| 4,178,124 A * | 12/1979 | Puskas | ...................... | F03D 1/04 415/4.5 |
| 4,213,734 A * | 7/1980 | Lagg | ..................... | F03B 17/061 415/4.3 |
| 5,080,553 A * | 1/1992 | Armel | ................... | F03D 1/0608 415/4.2 |
| 5,457,346 A * | 10/1995 | Blumberg | ................. | F03D 1/04 290/55 |
| 9,812,926 B1 * | 11/2017 | Rodriguez | ............... | F03D 9/00 |
| 2001/0004439 A1 * | 6/2001 | Bolcich | .................... | F03D 1/04 416/9 |
| 2003/0141721 A1 * | 7/2003 | Bartlett | ................. | F03D 1/0675 290/55 |
| 2005/0201855 A1 * | 9/2005 | Fan | ........................ | F03D 3/002 415/4.1 |
| 2008/0170941 A1 * | 7/2008 | Ghosh | .................... | F03D 15/10 416/121 |
| 2009/0053057 A1 * | 2/2009 | Royer | ...................... | F03D 1/04 415/220 |

(Continued)

*Primary Examiner* — Michael Lebentritt
(74) *Attorney, Agent, or Firm* — Gurr Brande & Spendlove, PLLC; Robert A. Gurr

(57) ABSTRACT

A funnel wind turbine has a horizontal funnel, rotor blades in the narrower end of the funnel, the rotor blades coupled to a rotor, a shaft coupling the rotor to a generator, and a support tower. The funnel wind turbine may have bearings or a yaw system to allow rotation of the horizontal funnel on the support tower. The funnel wind turbine may have wind direction and speed sensors, an electronic control unit, and a communication device (e.g., cellular antennas, radio transmitters/receivers, etc.) for transmitting information such as wind speed and direction, power generation, and efficiency to a distant receiver.

5 Claims, 17 Drawing Sheets

(56) References Cited

U.S. PATENT DOCUMENTS

| | | | |
|---|---|---|---|
| 2009/0160195 A1* | 6/2009 | Culjak | F03D 9/25 |
| | | | 290/55 |
| 2010/0060012 A1* | 3/2010 | Reitz | F03D 15/10 |
| | | | 290/55 |
| 2010/0314886 A1* | 12/2010 | Potter | F03D 1/04 |
| | | | 290/55 |
| 2011/0103955 A1* | 5/2011 | Desaulniers | F03D 1/0608 |
| | | | 416/183 |
| 2011/0204632 A1* | 8/2011 | Skala | F03D 1/04 |
| | | | 290/44 |
| 2013/0251506 A1* | 9/2013 | Chu | F03D 9/25 |
| | | | 415/4.3 |
| 2014/0105743 A1* | 4/2014 | Bassett | F03D 3/02 |
| | | | 416/126 |
| 2019/0003450 A1* | 1/2019 | Provost | F03D 1/04 |

* cited by examiner

FUNNEL WIND TURBINE

CROSS-REFERENCE TO RELATED APPLICATIONS

This application is a continuation-in-part of U.S. application Ser. No. 16/024,173, filed on Jun. 29, 2018, which is incorporated herein by reference.

TECHNICAL FIELD

The present disclosure relates to energy development. More particularly, the present disclosure relates to wind turbines.

BACKGROUND

Energy consumption increases daily, creating a constant need for energy development. Due to the limitations and harm of fossil fuels, the need to utilize other means for energy is apparent. As a result, there has been a steady increase in energy production using water, solar, wind, and other renewable sources. In particular, the use of wind turbines has increased due to the low environmental impact required and their relatively high efficiency. Further, wind turbines do not emit greenhouse gases or waste product, making them even more desirable. However, despite the benefits of using wind turbines, there are several drawbacks and limitations. For example, horizontal-axis wind turbines (HAWTs) are used commercially throughout the world. These turbines are usually three-bladed and are used in wind farms. These turbines are generally quite large, with the blades ranging from 66 feet to 262 feet in length. As appreciated, the length of the blades requires that the support tower be very tall as well. Due to the size of these machines, transportation, construction, and use are restricted. Not only do they require large open spaces for use due to the diameter of the blades, they can often be unsightly and the topic of debate. Vertical-axis wind turbines (VAWTs) generally do not require the same clearance, but have been shown to produce much less energy over time.

Further, low wind conditions also render wind turbines in the art useless due to the conservation of mass (the amount of air entering and exiting the turbine must be equal). Recently, attempts have been made in the art to produce wind turbines that can produce energy in low wind conditions by increasing the air passing over the blades. For example, a Minnesota-based company called Sheerwind designed a wind turbine coined the Invelox. This wind turbine is a vertical funnel with air intakes around the top sides of the funnel. As wind enters, it is forced downward through the funnel and past turbine blades, where the air exits near ground level. However, this system creates a large footprint, is unsightly, and requires a level of pressure for the wind to be forced down the funnel instead of being reflected off the intake opening.

Therefore, despite attempts in the prior art, there remains a need for a wind turbine that is highly efficient, requires less space than traditional wind turbines, and that can be used in a variety of settings. The present disclosure seeks to solve these and other problems.

SUMMARY OF EXAMPLE EMBODIMENTS

In one embodiment, a funnel wind turbine comprises a horizontal funnel, rotor blades in the narrower end of the funnel, the rotor blades coupled to a rotor, a shaft coupling the rotor to a generator, and a support tower.

In one embodiment, a funnel wind turbine comprises a horizontal funnel, rotor blades in the wider end of the funnel, the funnel positioned so that air enters the narrow end of the funnel and exits at the wider end, the rotor blades coupled to a rotor, a shaft coupling the rotor to a generator, and a support tower.

In one embodiment, a funnel wind turbine comprises a horizontal funnel coupled to a support tower using one or more bearings, wherein the horizontal funnel is rotatable on the support tower via the bearings. In one embodiment, a yaw system may be used in place of bearings to allow rotation of the horizontal funnel on the support tower.

In one embodiment, a funnel wind turbine comprises a horizontal funnel wherein the narrower end of the funnel flares outward to avoid negative pressure, the narrower end having rotor blades therein; the funnel wind turbine having wind direction and speed sensors, an electronic control unit, and a communication device (e.g., cellular antennas, radio transmitters/receivers, etc.) for transmitting information such as wind speed and direction, power generation, and efficiency.

In yet another embodiment, a funnel wind turbine comprises a horizontal funnel, the horizontal funnel comprising a first diameter at a first end and a second diameter at a second end, the first diameter being greater than the second diameter, the longitudinal axis of the horizontal funnel being parallel to the ground; a turbine body, the turbine body comprising a nozzle at a first end, a plurality of non-moving body segments, each non-moving body segment comprising fixed blades, and a plurality of rotor segments, each rotor segment comprising a plurality of blades; wherein a rotor shaft couples at least one rotor segment to a generator; and wherein the nozzle of the turbine body is received within the second end of the horizontal funnel, the turbine body being coupled to the second end of the horizontal funnel.

DETAILED DESCRIPTION OF EXAMPLE EMBODIMENTS

Figure 1:
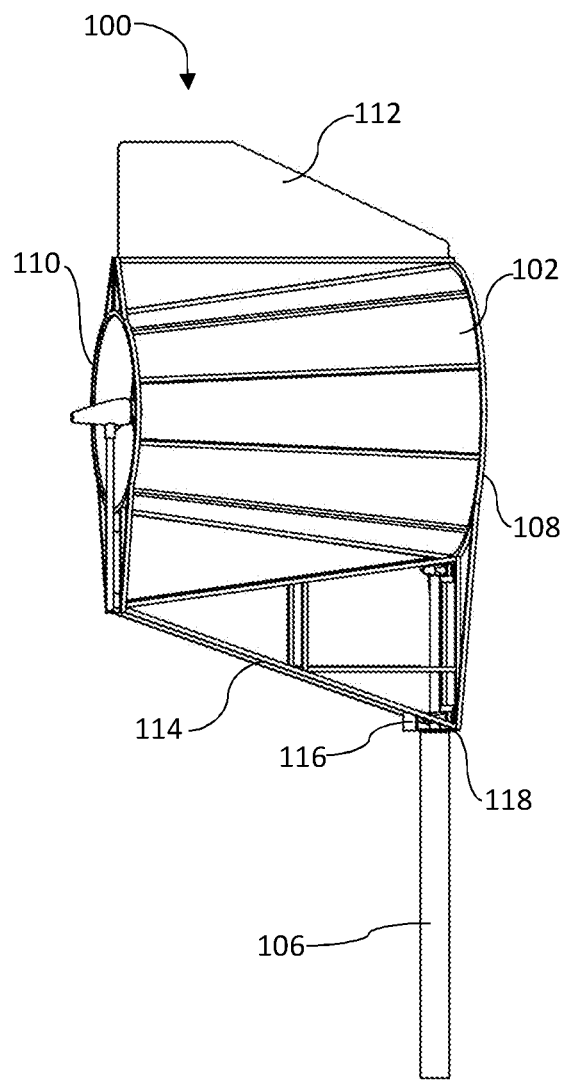
FIG. 1 is a side elevation view of a funnel wind turbine.
Figure 2:
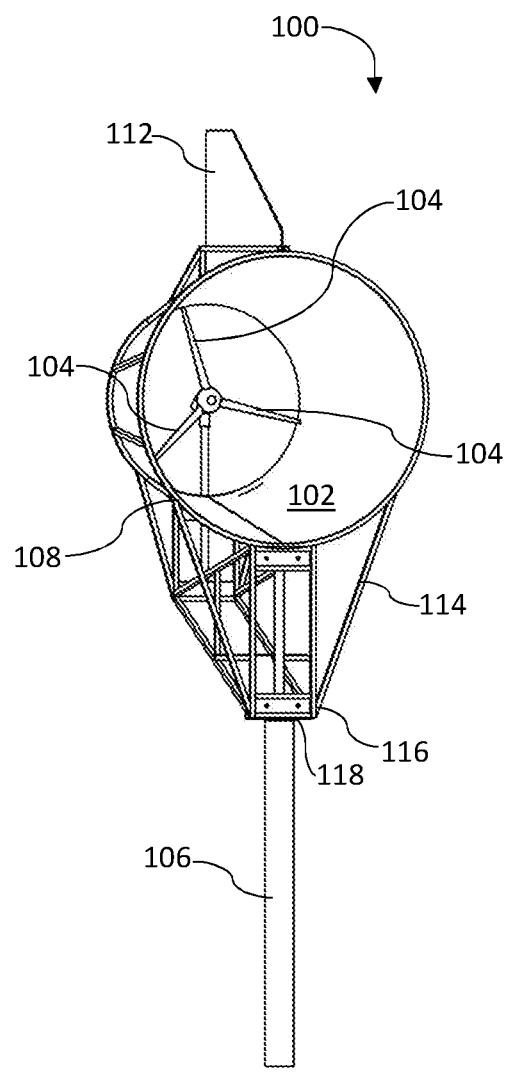
FIG. 2 is a front perspective view of a funnel wind turbine.
Figure 3:
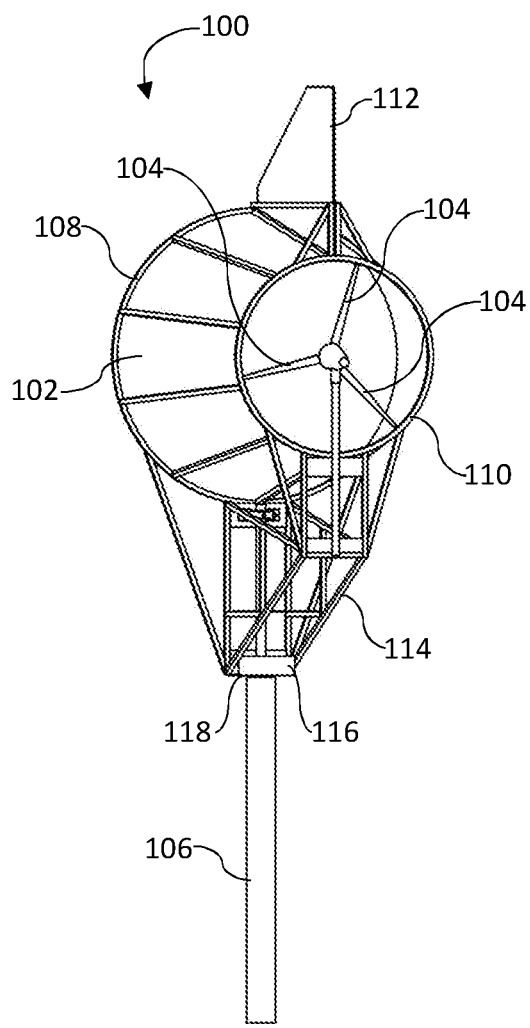
FIG. 3 is a rear perspective view of a funnel wind turbine.
Figure 4:
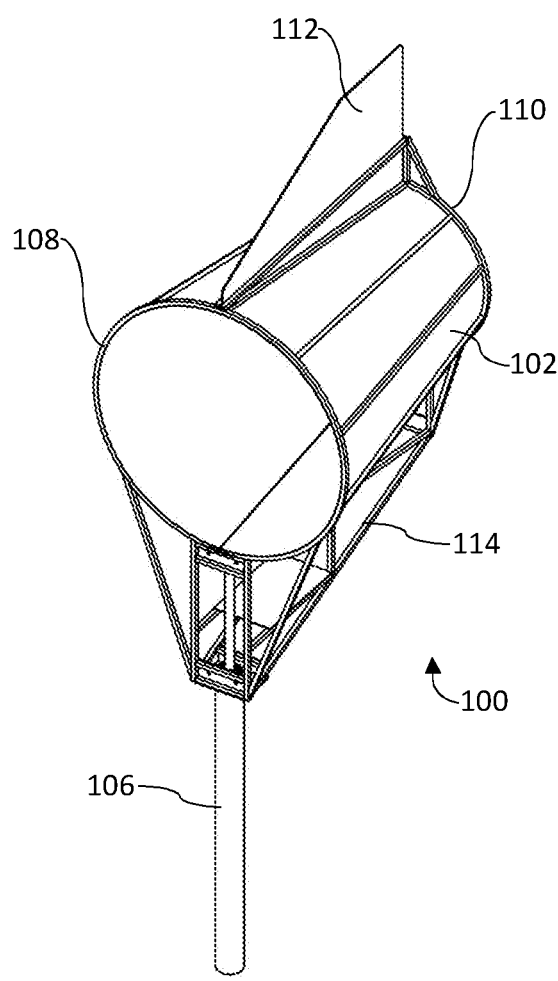
FIG. 4 is a top perspective view of a funnel wind turbine.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a wind turbine that is highly efficient, requires less space than traditional wind turbines, and that can be used in a variety of settings. The funnel wind turbine disclosed herein solves these needs and others.

In one embodiment, as shown generally in FIGS. 1-4, a funnel wind turbine 100 comprises a horizontal funnel 102, rotor blades 104 in the narrower end of the funnel 102, the rotor blades 104 coupled to (internal components not visible) a rotor, a shaft coupling the rotor to a generator, and a support tower 106. Funnel 102 is generally configured such that the front, first end 108 has a greater diameter than the second end 110. The first end 108 is an air intake, with the narrower, second end 110 being the air outlet. As will be understood, because the first end 108 is larger than the second end 110, the air passing therethrough is compressed. In fluid dynamics, the fluid's velocity must increase as it passes through a constriction (i.e., the Venturi effect). Accordingly, the velocity of the air is increased as it passes over the rotor blades 104, causing them to rotate at a higher speed, which in turn generates higher energy and electricity.

In one non-limiting example, the air is compressed about two and a quarter times in the funnel 102. This may be accomplished using any number of sizes to achieve that ratio, but in one example, the larger diameter end of the funnel 102 is about sixty inches and the narrower end has a diameter of about forty inches. The length of the funnel may also be around six to eight feet in this example. As such, as wind enters the first end 108, it is compressed about 2.25 times over the course of six to eight feet before it engages the rotor blades 104 and exits the funnel 102. Again, it will be appreciated that the funnel 102 is not limited to the specific dimensions listed above, and may be in a variety of diameters and lengths. Indeed, while the compression is listed at 2.25 above, such compression may be varied without departing herefrom. There are several benefits to the funnel wind turbine 100 described above. First, the blades 104 can be shorter than traditional HAWT blades while achieving similar RPMs. In other words, due to the compression of wind, the blades 104 come into contact with higher pressure (i.e., faster moving) wind, allowing them to achieve the same rotation with less surface area. Because of this compression, the blades 104 will rotate in winds that, traditionally, would not be powerful enough to rotate standard HAWT blades, or that would rotate HAWT blades slowly. As a result, the funnel wind turbine 100 is able to generate electricity in conditions that standard HAWT wind turbines would not. As a result, the funnel wind turbine 100 is more cost effective to manufacture, easier to transport and install, and has greater efficiency than standard HAWT and VAWT wind turbines.

In one embodiment, a tail fin 112 may be coupled to the funnel wind turbine 100 to influence the direction of the funnel 102. For example, the horizontal funnel may be coupled to a support frame 114, the support frame 114 rotatable on the support tower 106. This may be accomplished using bearings, bushings, or similar devices known in the art. In one example, the frame 114 rests on a first plate 116 which is separated from a second plate 118 with bearings (not visible) interposed therebetween. As such, the bearings facilitate easy rotation of the funnel 102. Any electrical wires may be coupled to the support tower 106 through the use of bushings and contact points, such that the wires do not become twisted as the funnel 102 rotates. Therefore, as the wind changes direction, the funnel 102 compensates, ensuring that maximum airflow is entering the funnel 102 through the first end 108 having the large diameter opening. It will be appreciated that while bearings are discussed above, a yaw system known by those in the art may also be used.

Figure 11:
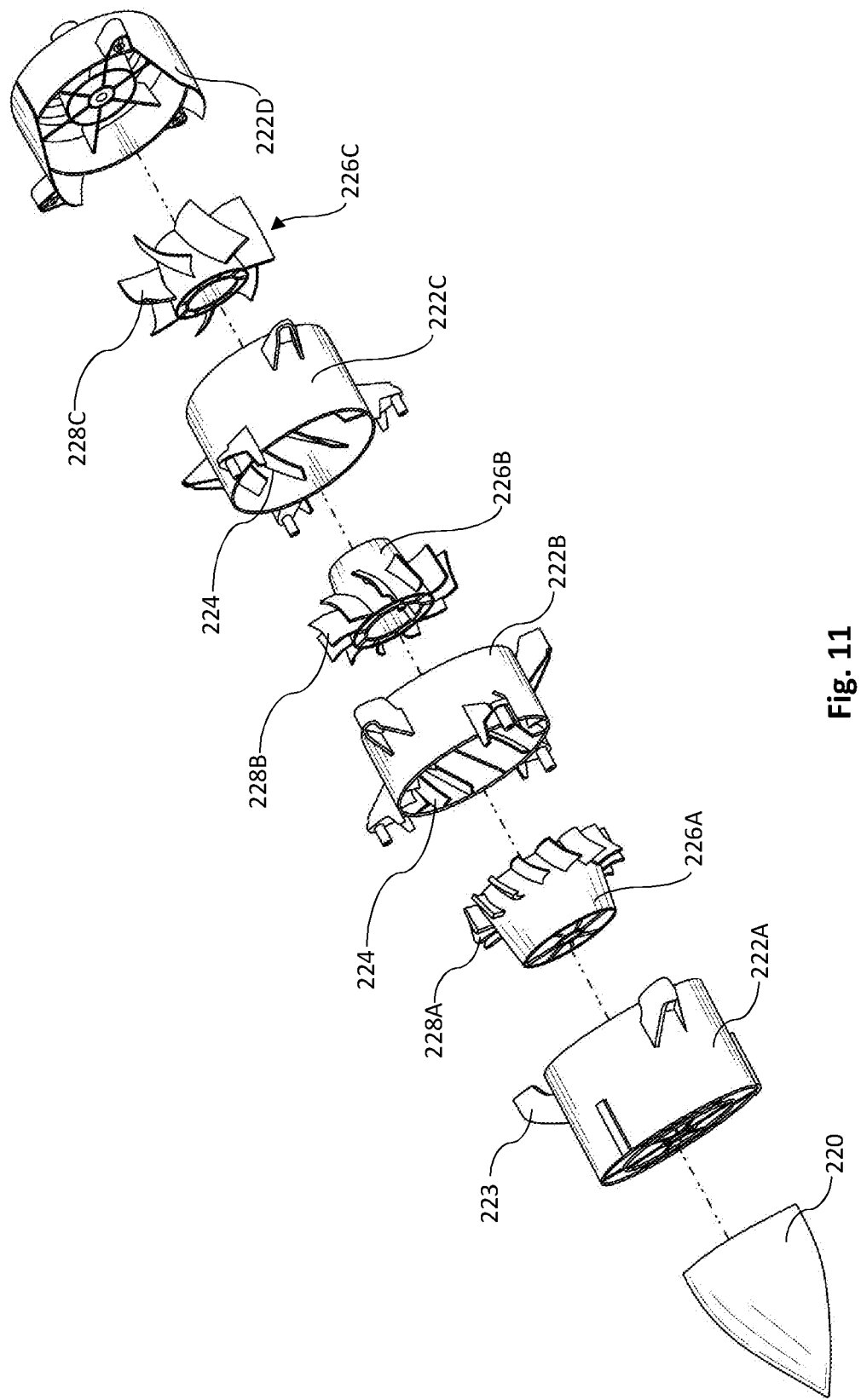
FIG. 11 is an exploded view of a turbine body of a funnel wind turbine.

In one embodiment, as shown in FIGS. 5-10, a funnel wind turbine 200 comprises a horizontal funnel 202, the horizontal funnel 202 comprising a first diameter at a first end 208 and a second diameter at a second end 210, the first diameter being greater than the second diameter. The longitudinal axis of the horizontal funnel 202 is generally parallel to the ground. Unlike the prior art, because funnel 202 is parallel to the ground, lower wind velocities are still able to enter and exit the turbine system with lower pressure required, and therefore less feedback. However, the pitch may be adjusted without departing herefrom. In some examples, the longitudinal axis may be at a 45-degree angle to the ground. Altering the angles will not depart herefrom. The funnel wind turbine 200 further comprises a turbine body 204. As best shown in FIG. 11, the turbine body 204 comprises a nozzle 220 at a first end, a plurality of non-moving body segments 222A-222D (which may function as stators), one or more non-moving body segments 222A-222D may comprise fixed blades 224, and a plurality of rotor segments 226A-226C, each rotor segment 226A-226C comprising a plurality of blades 228A-228C. The non-moving body segments 222A-222D may be coupled together using external bolt flanges 223, with the rotor segments rotatably secured therein (e.g., rotor shaft or similar may be used). Returning to FIG. 5, a rotor shaft 230 couples at least one rotor segment 226A-226C to a generator 232. As shown best in FIGS. 6 and 8, the nozzle 220 of the turbine body 204 is received within the second end 210 of the horizontal funnel 202 with the turbine body 204 being coupled to the second end 210 of the horizontal funnel 202 (e.g., screws, bolts, welds, etc.). Support frame 214 supports the turbine body 204 on the support tower 206. Like the earlier embodiment, the support frame 214 may comprise a base plate 216 to engage the top plate 218 of the support tower 206. Again, bearings or similar may be used to allow rotation of the support frame 214 on the support tower 206, with a tail fin 212 aiding in direction control. The tail fin 212, and other accessories (e.g., Anemometer, transceivers, solar panels, etc.) may be coupled to an accessory frame 213.

Figure 5:
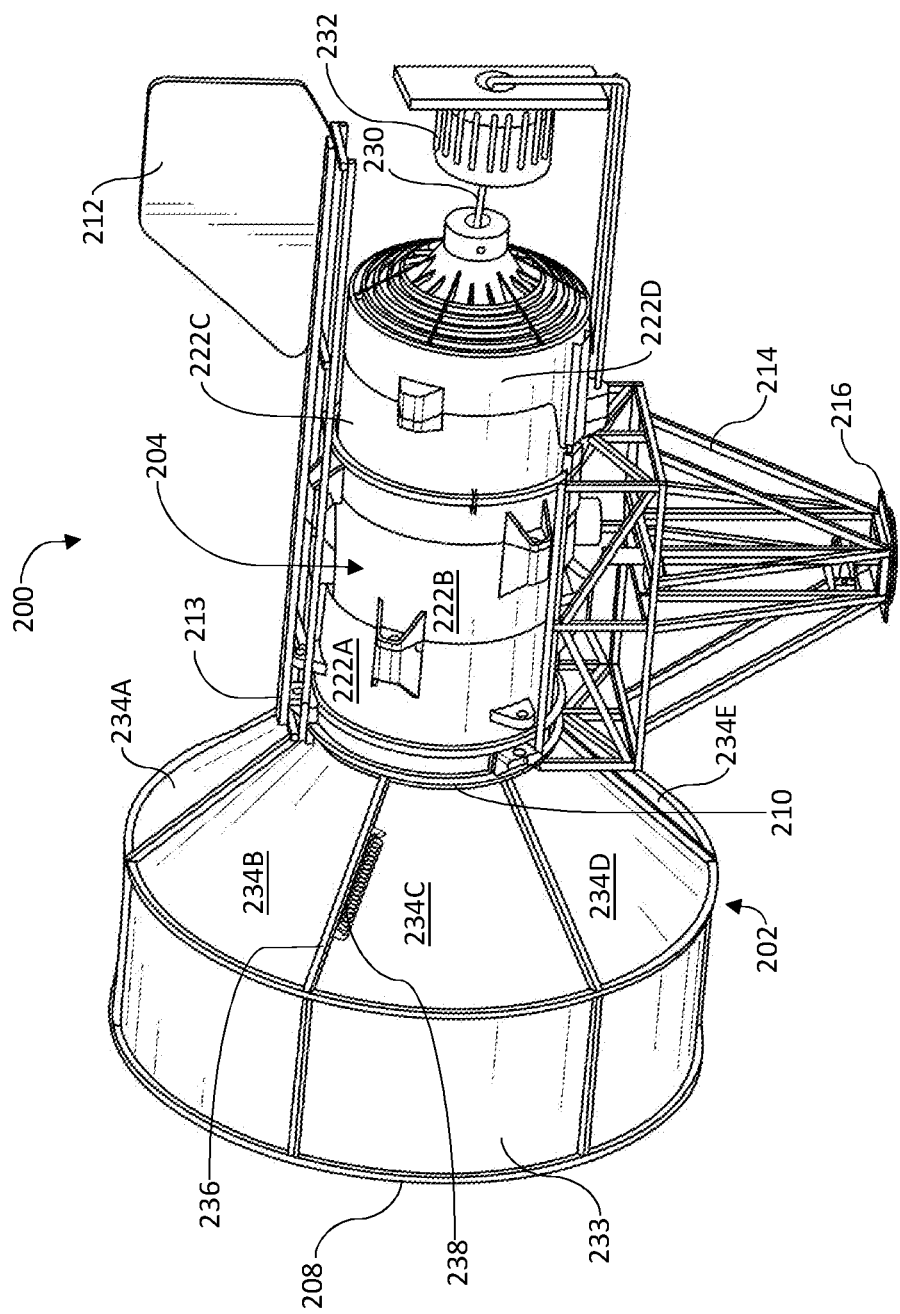
FIG. 5 is a rear perspective view of a funnel wind turbine.
Figure 6:
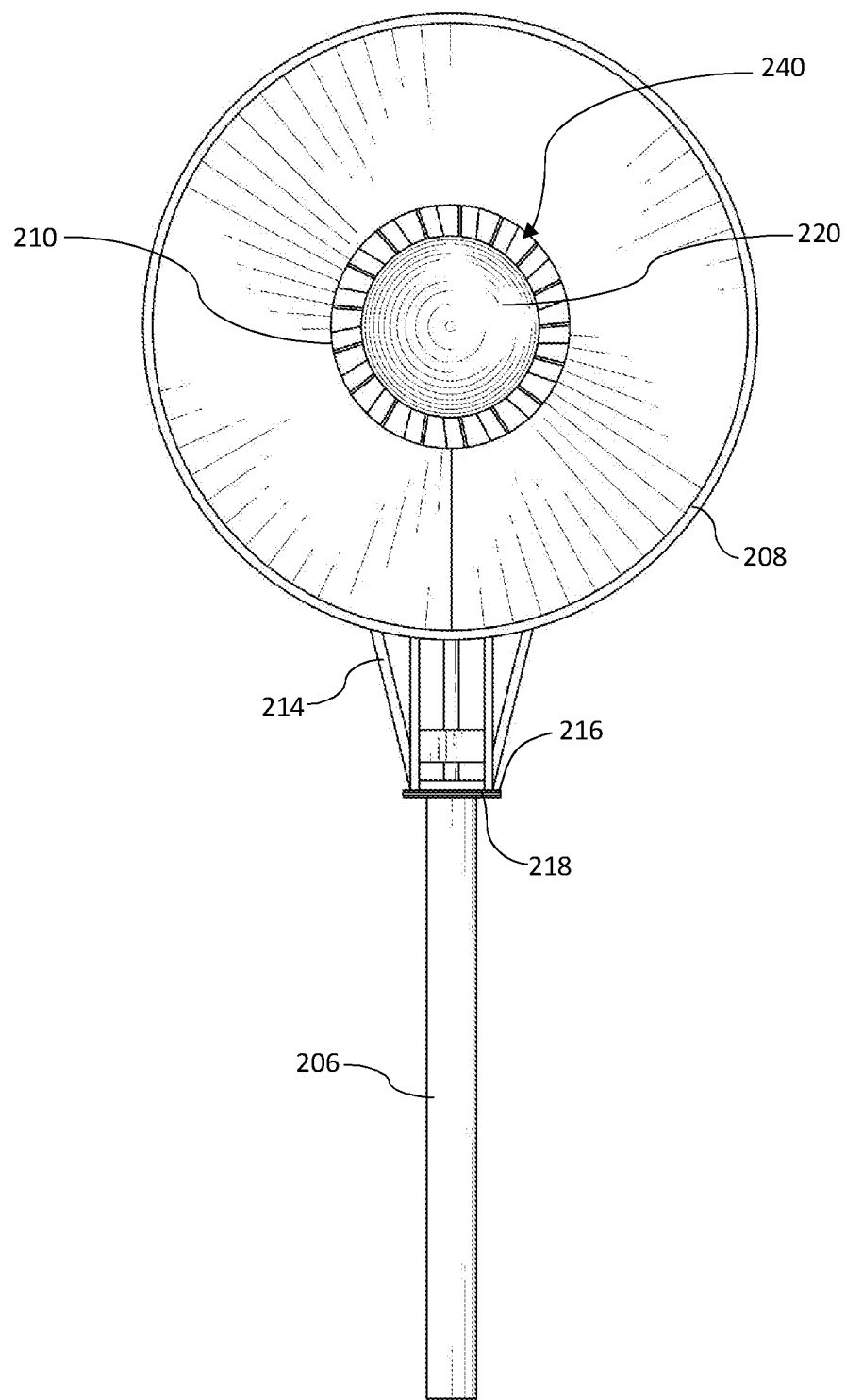
FIG. 6 is a front elevation view of a funnel wind turbine.
Figure 7:
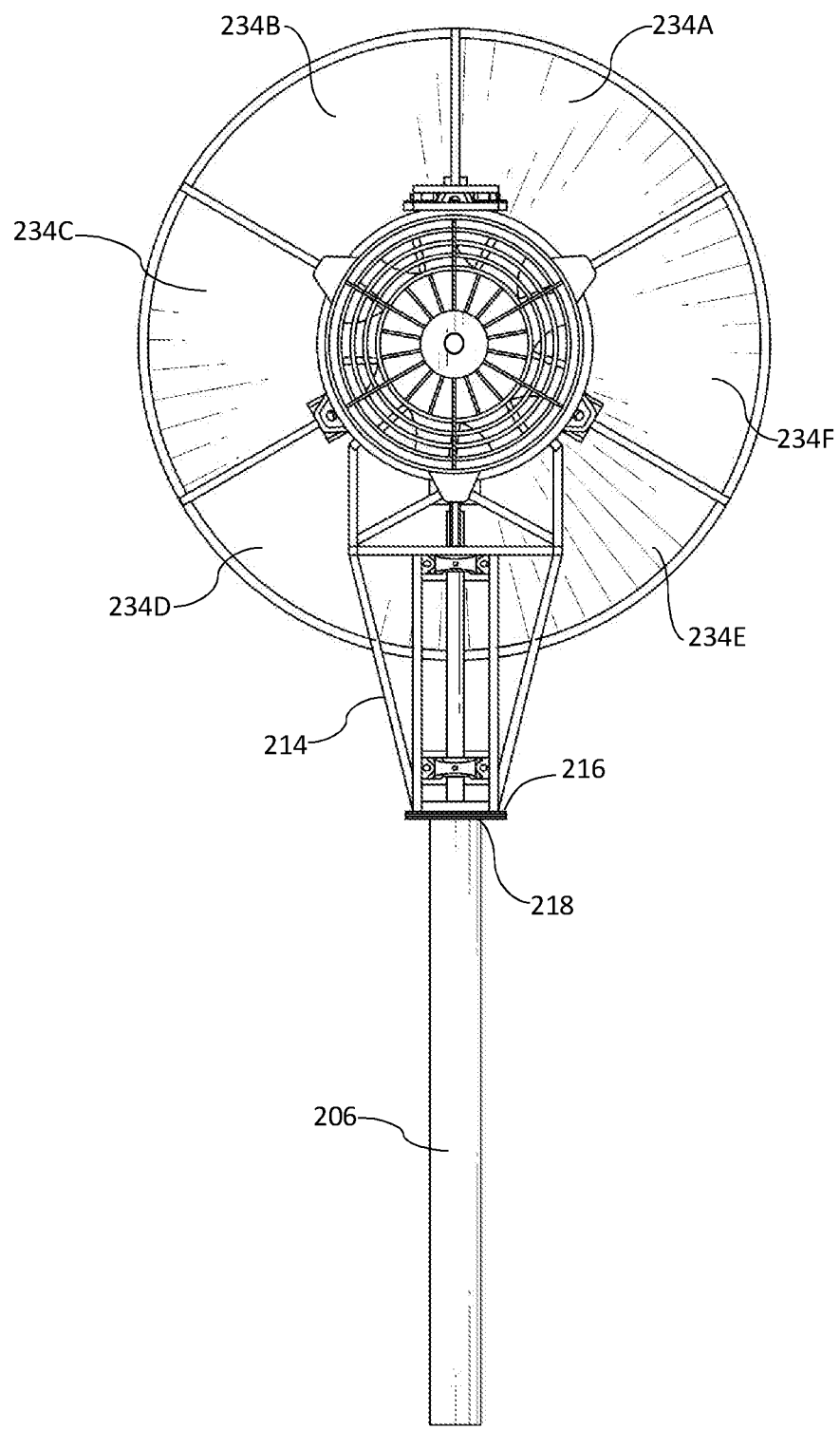
FIG. 7 is a rear elevation view of a funnel wind turbine.
Figure 8:
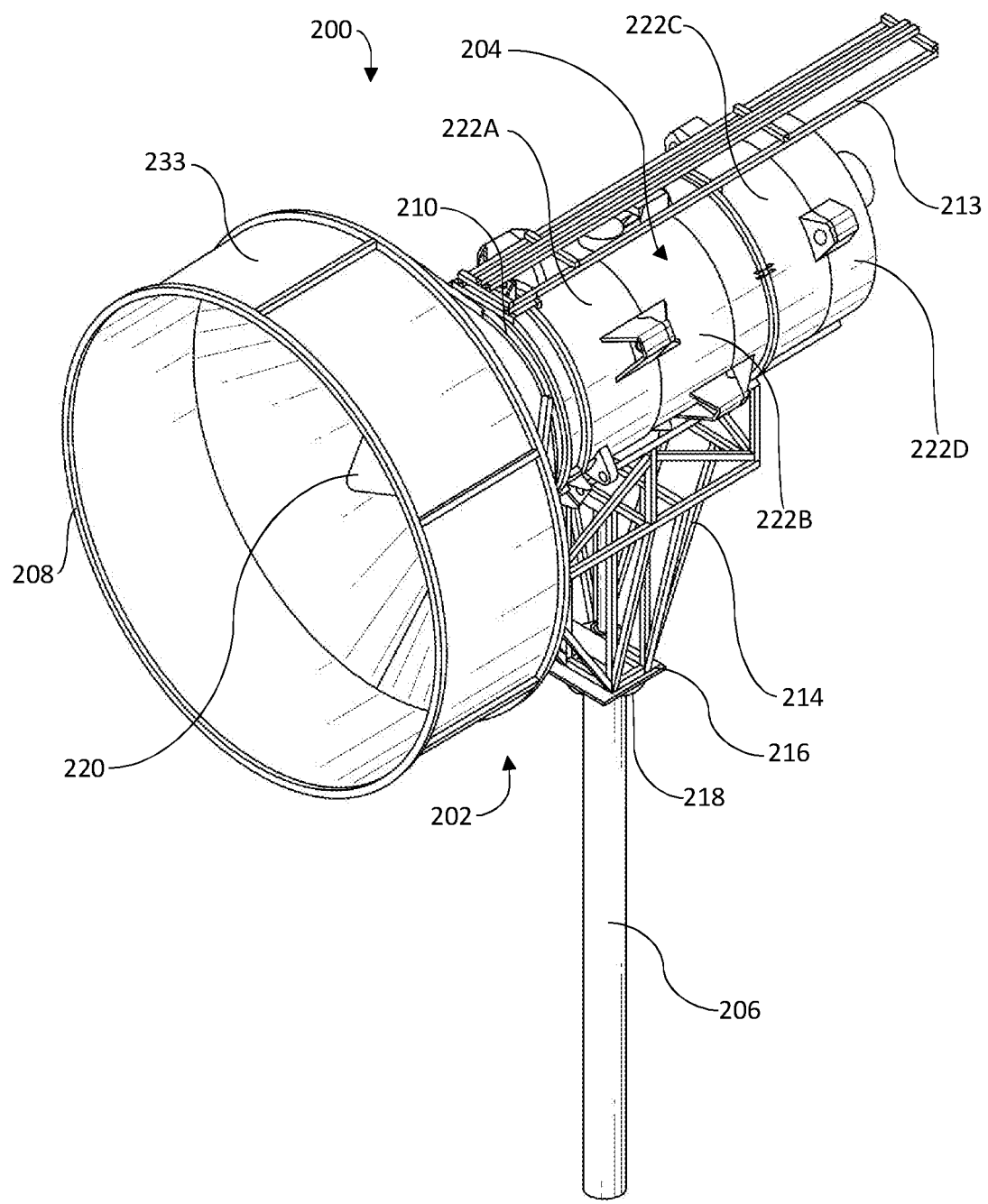
FIG. 8 is a front perspective view of a funnel wind turbine.
Figure 9:
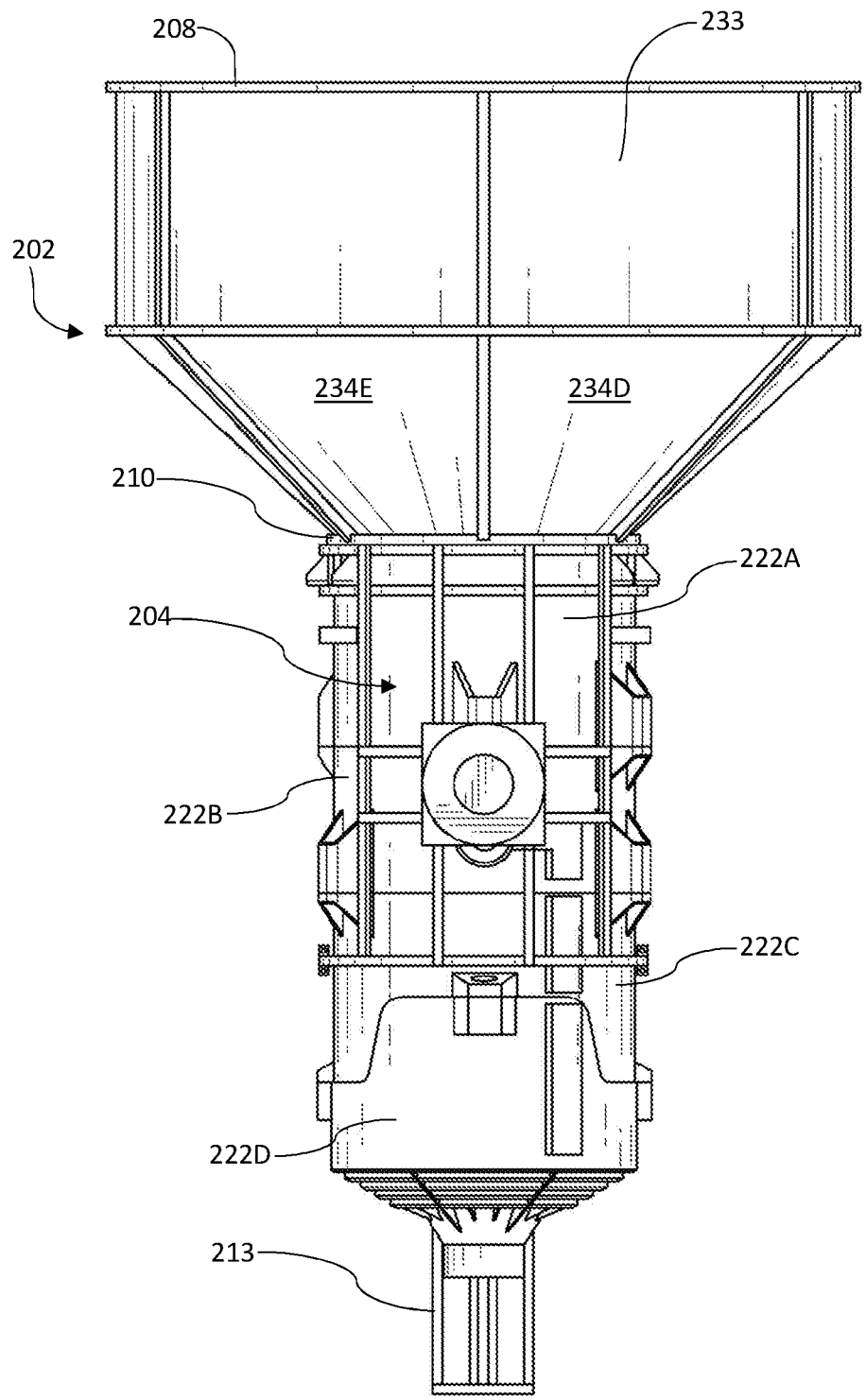
FIG. 9 is bottom plan view of a funnel wind turbine.
Figure 10:
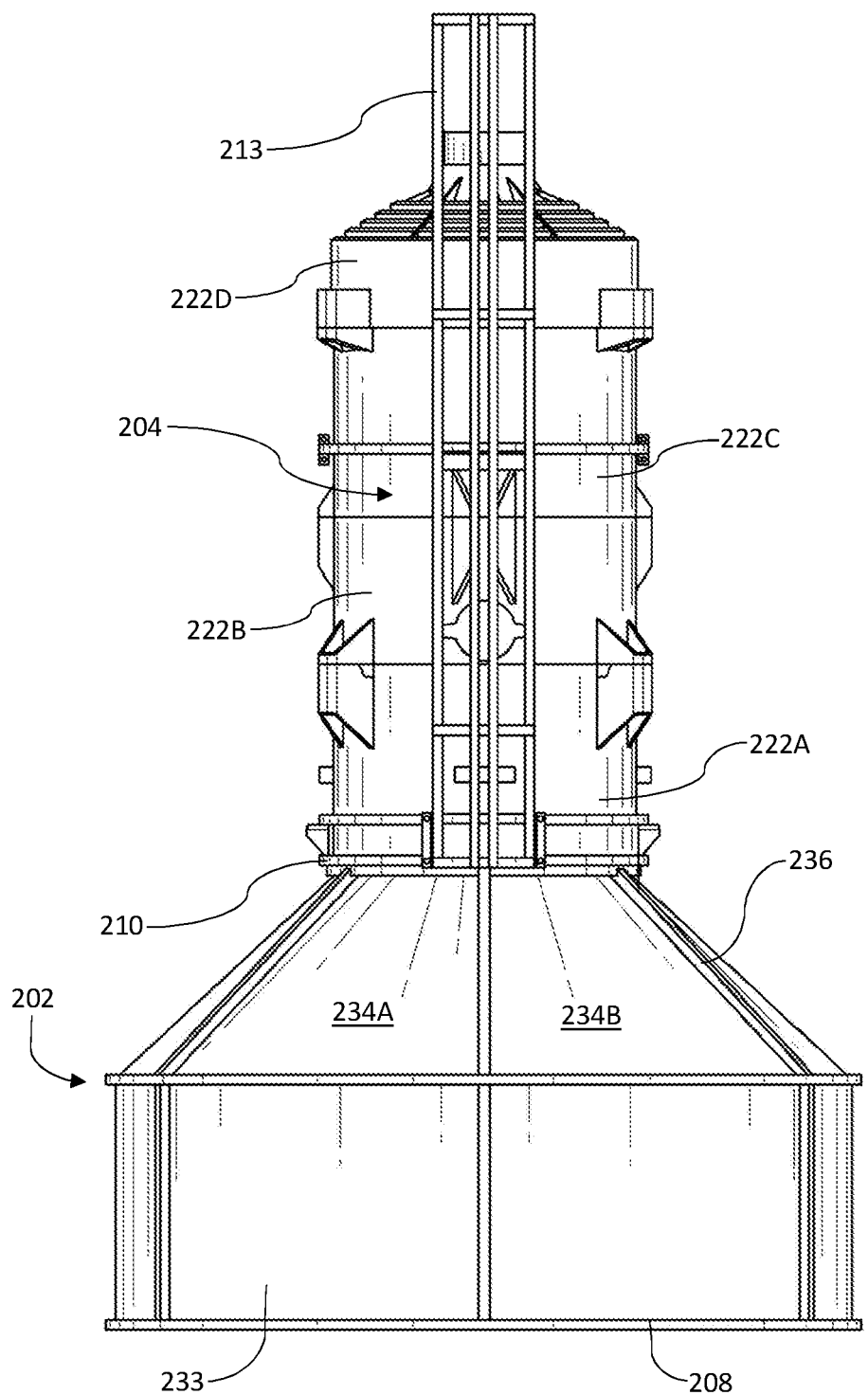
FIG. 10 is a top plan view of a funnel wind turbine.

In one embodiment, as shown in FIGS. 5-10, the horizontal funnel 202 comprises an intake cylinder 233 at the first end 208 and a plurality of panels 234A-234F tapering to the second end 210. However, it will be noted that intake cylinder 233 is not required. In one embodiment, as illustrated in FIG. 5, at least one panel 234C is hingedly coupled to the funnel frame 236. This may be accomplished using a spring-loaded hinge 238. With this configuration, if the pressure inside the funnel 202 reaches a pre-determined threshold (set by the tension strength of the spring-loaded hinge 238), the at least one panel 234C will open, extending outwardly, allowing pressurized wind to exit the funnel 202 without passing through the turbine body 204. Once the pressure reduces, the spring-loaded hinge 238 pulls the at least one panel 234C closed again. This configuration lowers the risk of damage to the turbine, generator, or other components. While a hinged mechanism is shown and described, other mechanisms may be used to release the pressure. For example, in one embodiment, a funnel wind turbine comprises a horizontal funnel wherein the narrower end of the funnel flares outward to avoid negative pressure.

Therefore, in one method of use, the first end 208 of the horizontal funnel 202 is positioned to receive wind, the received wind compressing as it moves through the funnel 202 toward the second end 210. The wind passes around the nozzle 220 and into the turbine body 204 via inlet apertures 240 (best seen in FIG. 6). The wind is then forced through the plurality of fixed blades 224 of the non-moving body segments 222A-222D and then causes rotation of the blades 228A-228C of the rotor segments 226A-226C. At least one of the rotor segments 226A-226C is coupled to, and drives, a rotor shaft 230. The rotor shaft 230 is coupled to the generator 232, which converts kinetic energy into electricity. It will be appreciated that, while not shown, a gearbox may be used between the rotor shaft 230 and the generator 232 to increase the RPM of the generator. In one embodiment, the tail fin 212 aids the turbine body 204 in rotating so as to ensure maximum wind is received through the first end 208 of the funnel 202. However, it will be appreciated that the tail fin 212 and rotating capabilities are not required, and the present disclosure contemplates a stationary funnel wind turbine as well.

Figure 12:
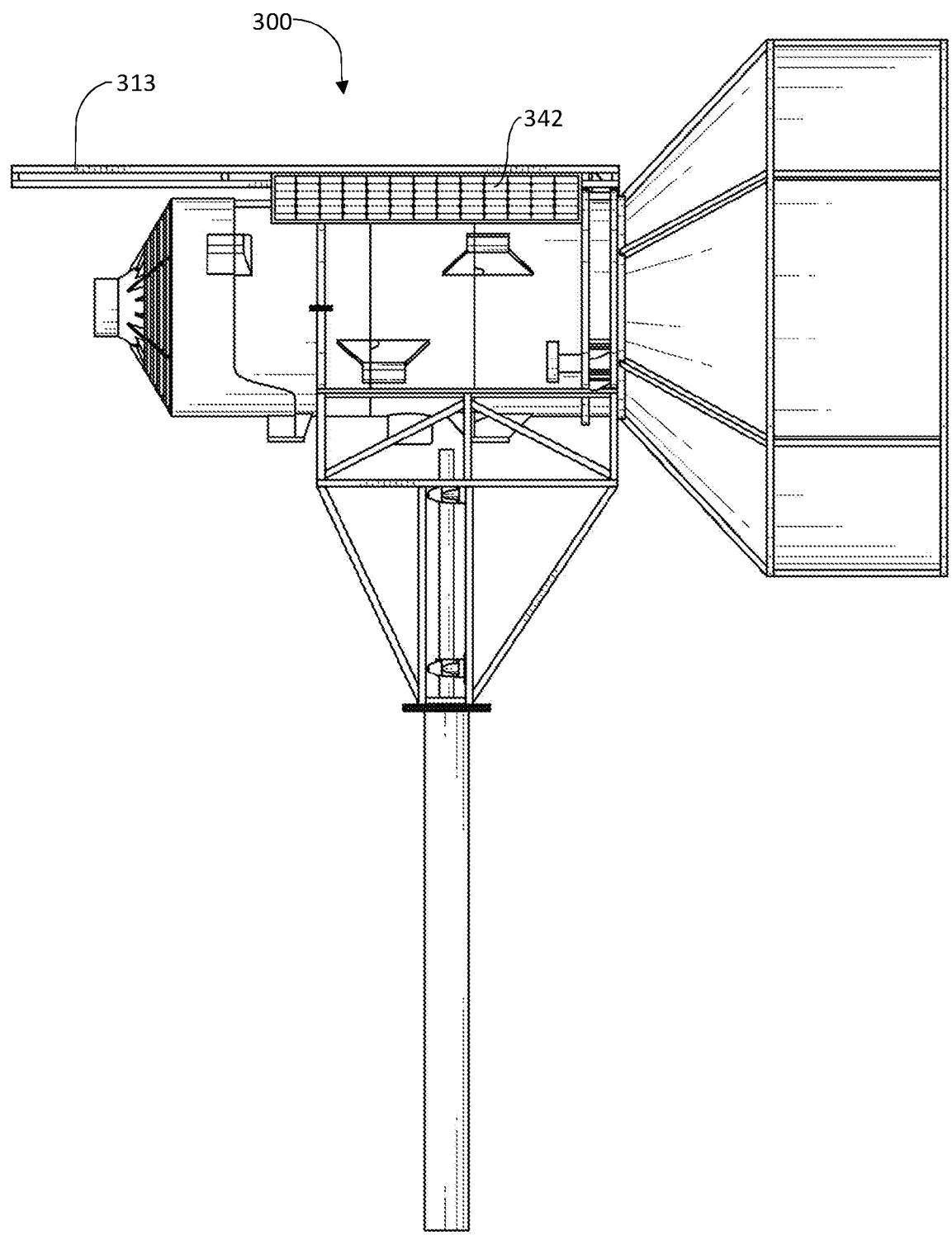
FIG. 12 is a side elevation view of a funnel wind turbine comprising a solar panel.

In one embodiment, as shown in FIG. 12, a funnel wind turbine 300 comprises at least one solar panel 342, which may be coupled to an accessory frame 313. The solar power generated by the solar panel 342 may be used to supplement the power generated by the turbine-generator system. However, the solar panel 342 may also be used to power additional components, such as motor controls for rotating the funnel wind turbine 300, for powering reporting components, such as data transmitters, or for other uses.

In one embodiment, the funnel wind turbine further comprises wind direction and speed sensors, an electronic control unit, and a communication device (e.g., cellular antennas, radio transmitters/receivers, etc.) for transmitting information such as wind speed and direction, power generation, and efficiency. These components may be coupled to the accessory frame 313. In other words, the electronic control unit receives information from one or more sensors, processes the information, and is capable of transmitting the information, via a communication device, to a receiver for review by a user. In one embodiment, the user may input parameters to the funnel wind turbine using an input device separate from the funnel wind turbine, such as a laptop, tablet, phone, etc. Example input parameters may be an adjustment to pitch or direction of the funnel. The information received may relate to wind speed, direction, temperature, blade speed, electricity production, etc., which allows a user to actively monitor the status of the funnel wind turbine without needing to be physically proximal to the funnel wind turbine.

Figure 13:
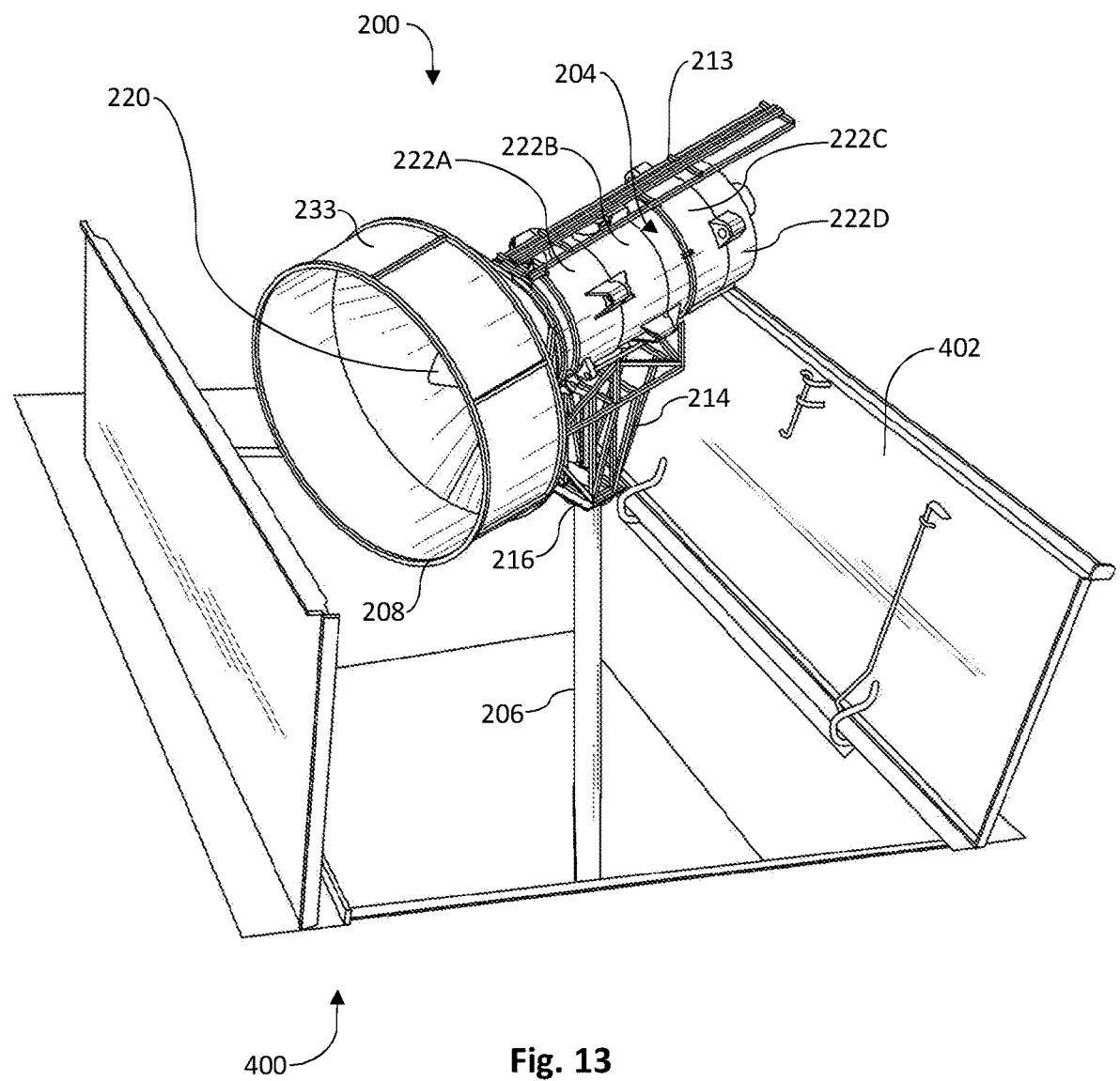
FIG. 13 is a perspective view of a funnel wind turbine and associated bunker.

In one embodiment, as shown in FIG. 13, a funnel wind turbine 200 may be lowered into a bunker 400. The funnel wind turbine 200 may be raised and lowered using hydraulics, screw drives, or any other number of linear actuators. The support tower 206 may be telescopic as well, allowing for easier extension and retraction. The raising and lowering may be controlled via one or more weather sensors and a microcontroller, which controls the linear actuators, with the microcontroller initiating the linear actuation when a set of predefined parameters are received (e.g., wind speed, humidity, etc.). In another example, the raising and lowering may be controlled off-site by a user, the user sending control signals to the linear actuators using wired or wireless telecommunications technologies. Further, the bunker lids 402 may be coupled to the funnel wind turbine 200 so as to open and close kinetically. Alternatively, the bunker lids 402 may be motor controlled as well.

It will be understood that the funnel wind turbine herein may be configured in a variety of shapes, including conical, but may also be configured with straight, rather than rounded dimensions (e.g., cuboid-shaped funnel).

Figure 14:
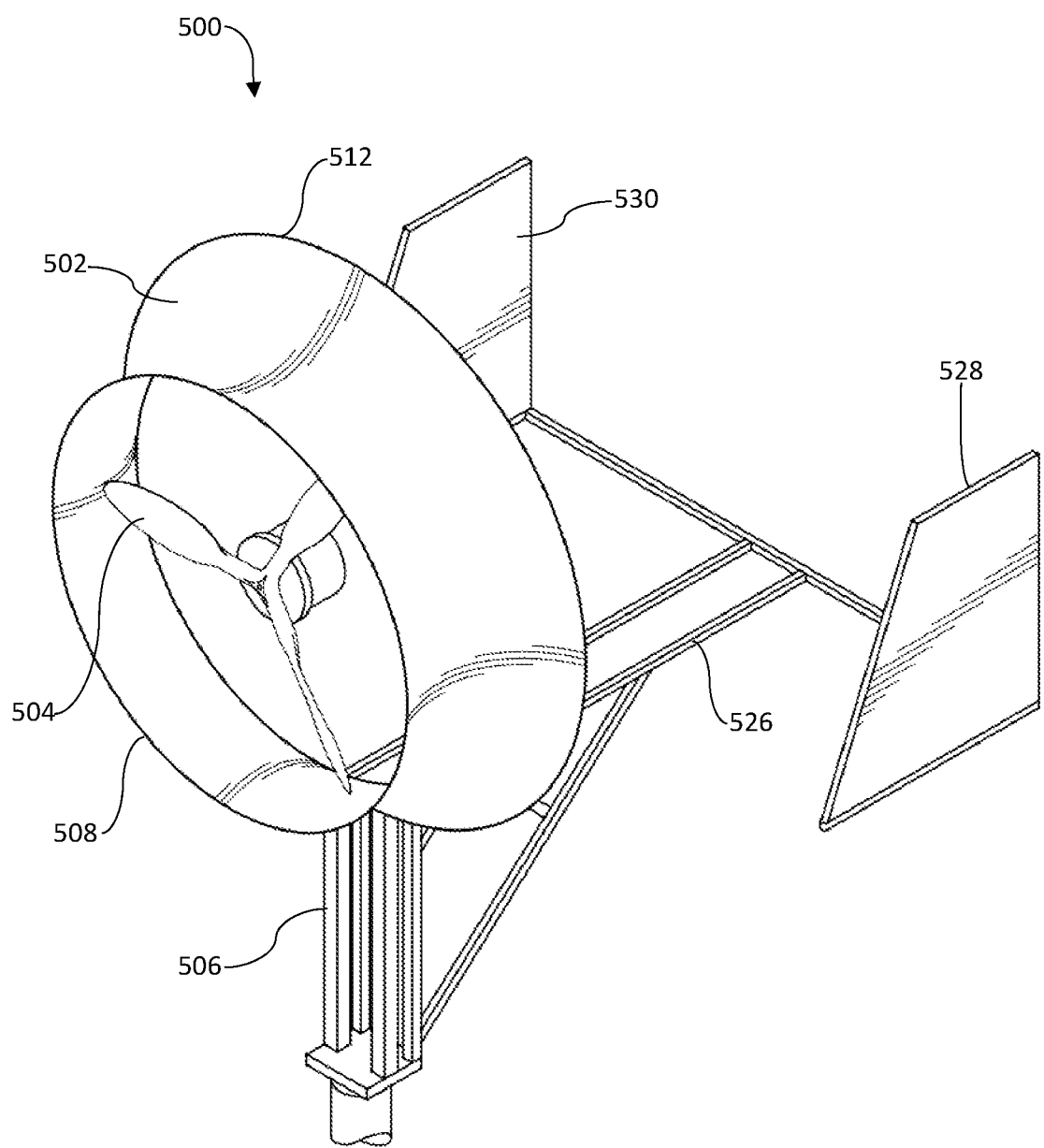
FIG. 14 is a front perspective view of a funnel wind turbine.
Figure 15:
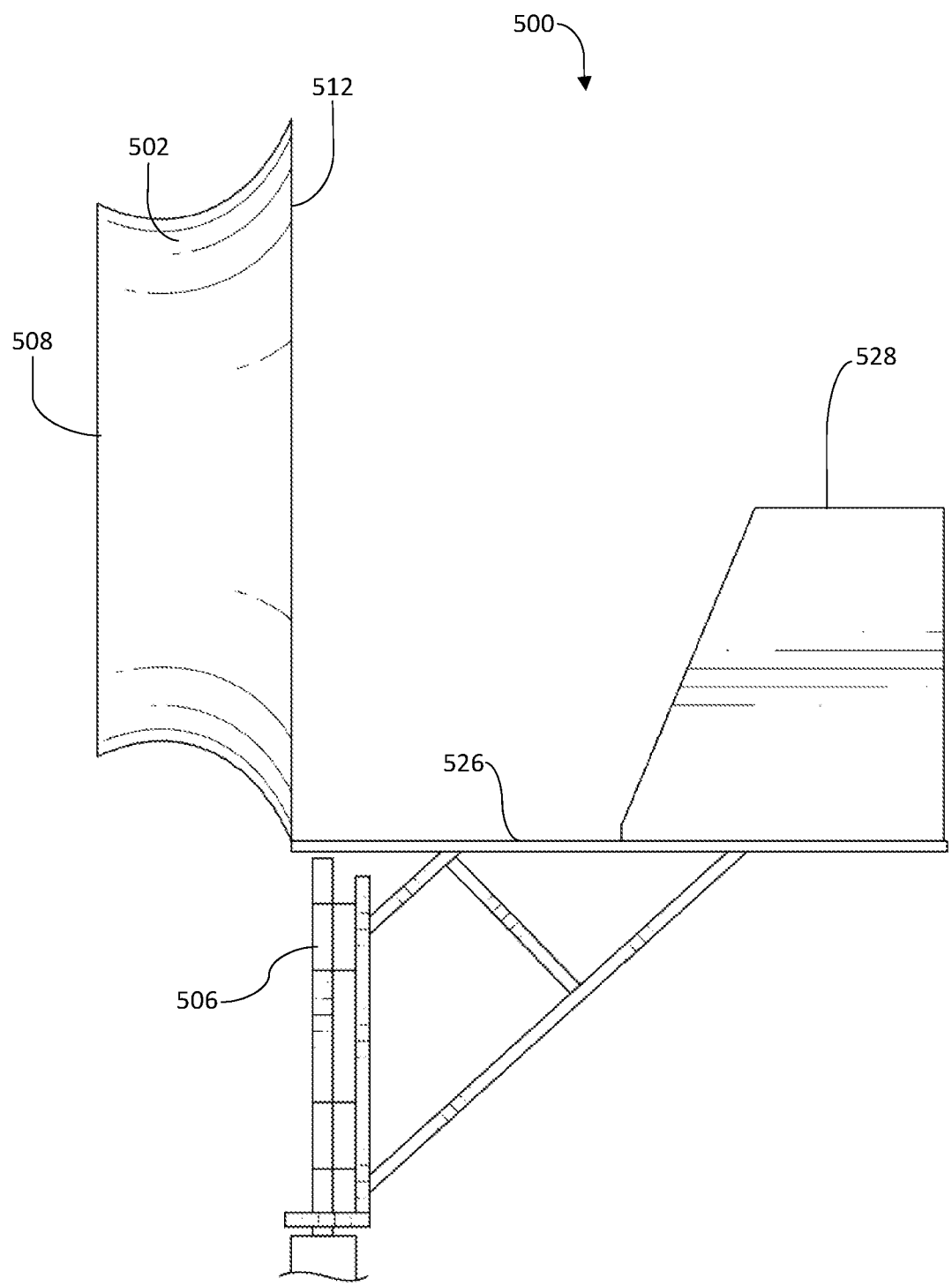
FIG. 15 is a side elevation view of a funnel wind turbine.
Figure 16:
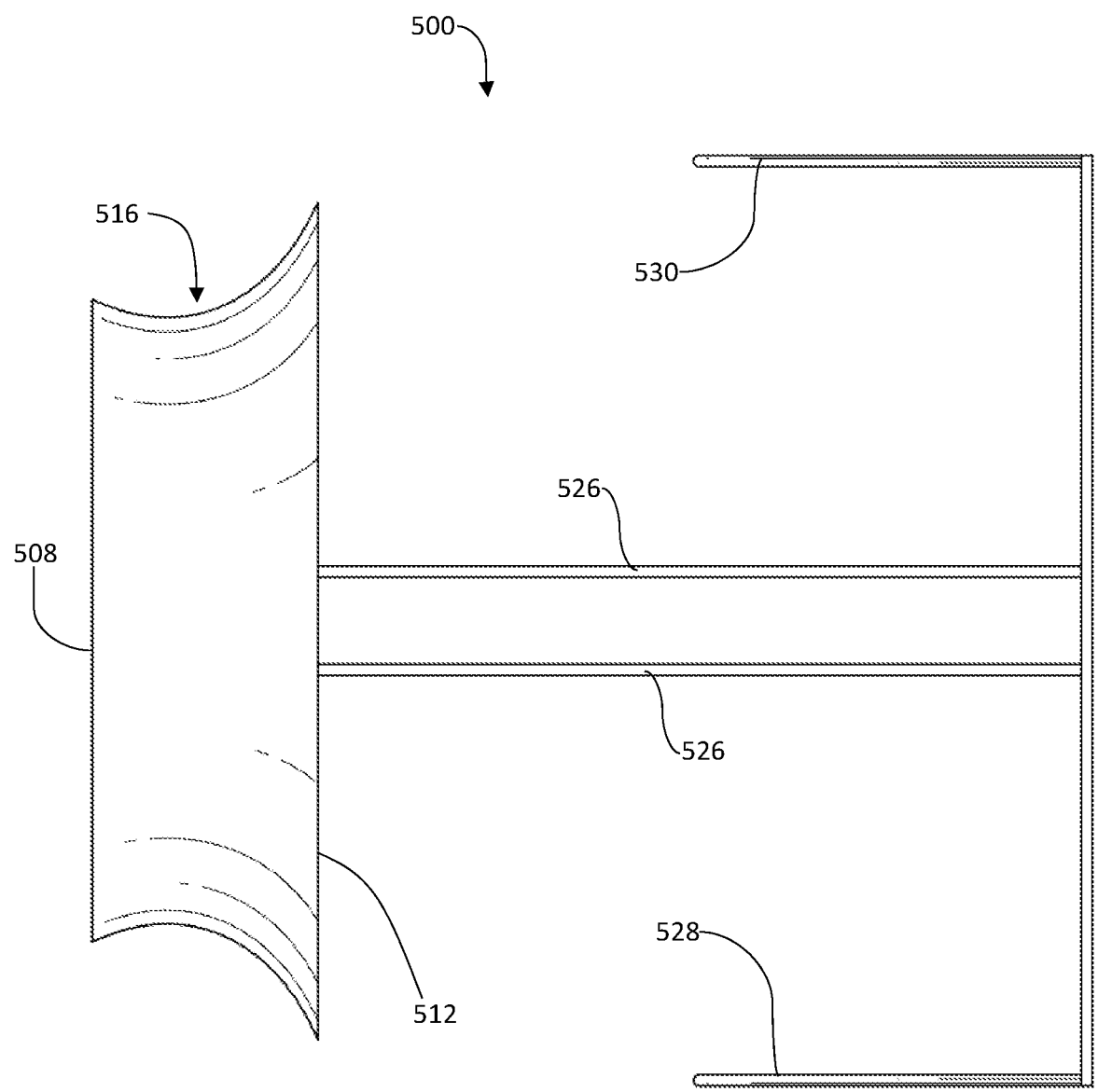
FIG. 16 is a top plan view of a funnel wind turbine.
Figure 17:
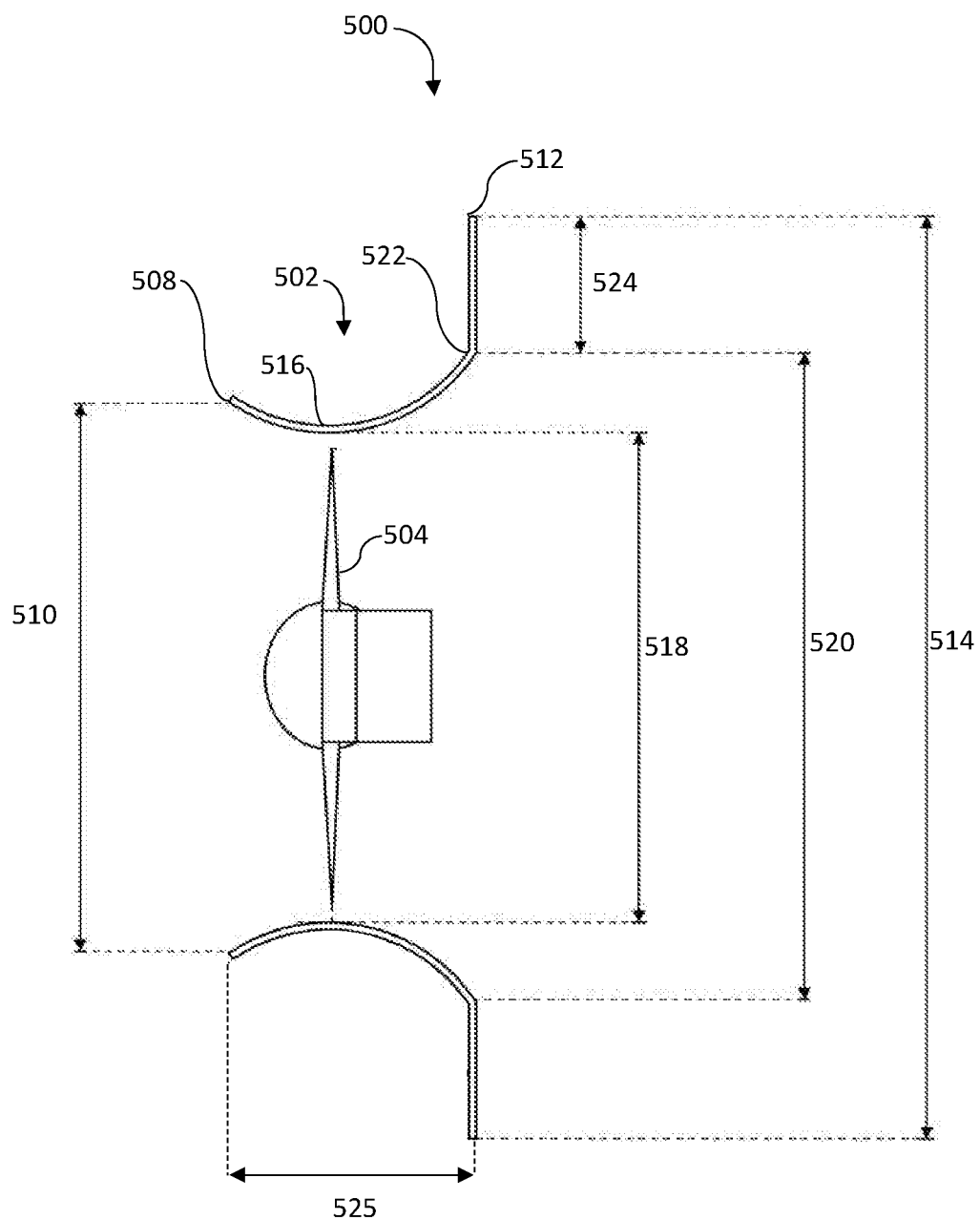
FIG. 17 is a side elevational view with dimensions.

In one embodiment, as shown generally in FIGS. 14-17, a funnel wind turbine 500 comprises a horizontal funnel 502, rotor blades 504 in the narrow portion of the funnel 502, the rotor blades 504 coupled to (internal components not visible) a rotor, a shaft coupling the rotor to a generator, and a support tower 506. As best seen in FIG. 17, funnel 502 is generally configured such that the intake end 508 has a first diameter 510, an outlet end 512 has a second diameter 514, and narrow portion 516 interposed between the first end 508 and second end 512 has a third diameter 518. In this embodiment, the third diameter 518 is less than the first diameter 510, with the first diameter 510 being less than the second diameter 514. The intake end 508 being narrower, with the widest end being outlet end 512. As shown, the rotor blades 504 are positioned in the narrowest portion 516 having the diameter 518. As shown, the outlet end 512 may comprise second diameter 514, calculated at the brim of the funnel 502, and fourth diameter 520, calculated at bend 522. While bend 522 is shown as a hard angle in FIG. 17, such an angle is not required and the funnel 502 may be tapered (as illustrated in FIGS. 14-16), eliminating bend 522. However, in one embodiment, the distance between the bend 522 and the brim of second end 512 is a distance 524, the bend 522 and second end 512 being in the same vertical geometric plane. Distance 524 aids in rotating the funnel turbine 500 according to wind direction.

The funnel 502 comprising a plurality of diameters creates pressure differences. In other words, because the widest diameters (i.e., second diameter 514 and fourth diameter 520) are at the outlet, a strong vortex (e.g., Karman) is created behind the funnel 502. This creates a low-pressure region, which draws more flow (e.g., vacuum) into the funnel opening (i.e., first end 508). As a result, the increased airflow augments the power generation significantly. The width 525 of the narrow portion 516 may also affect the output. In one embodiment, the width 525 is about one and a half times greater than the third diameter 518.

Figure 18:
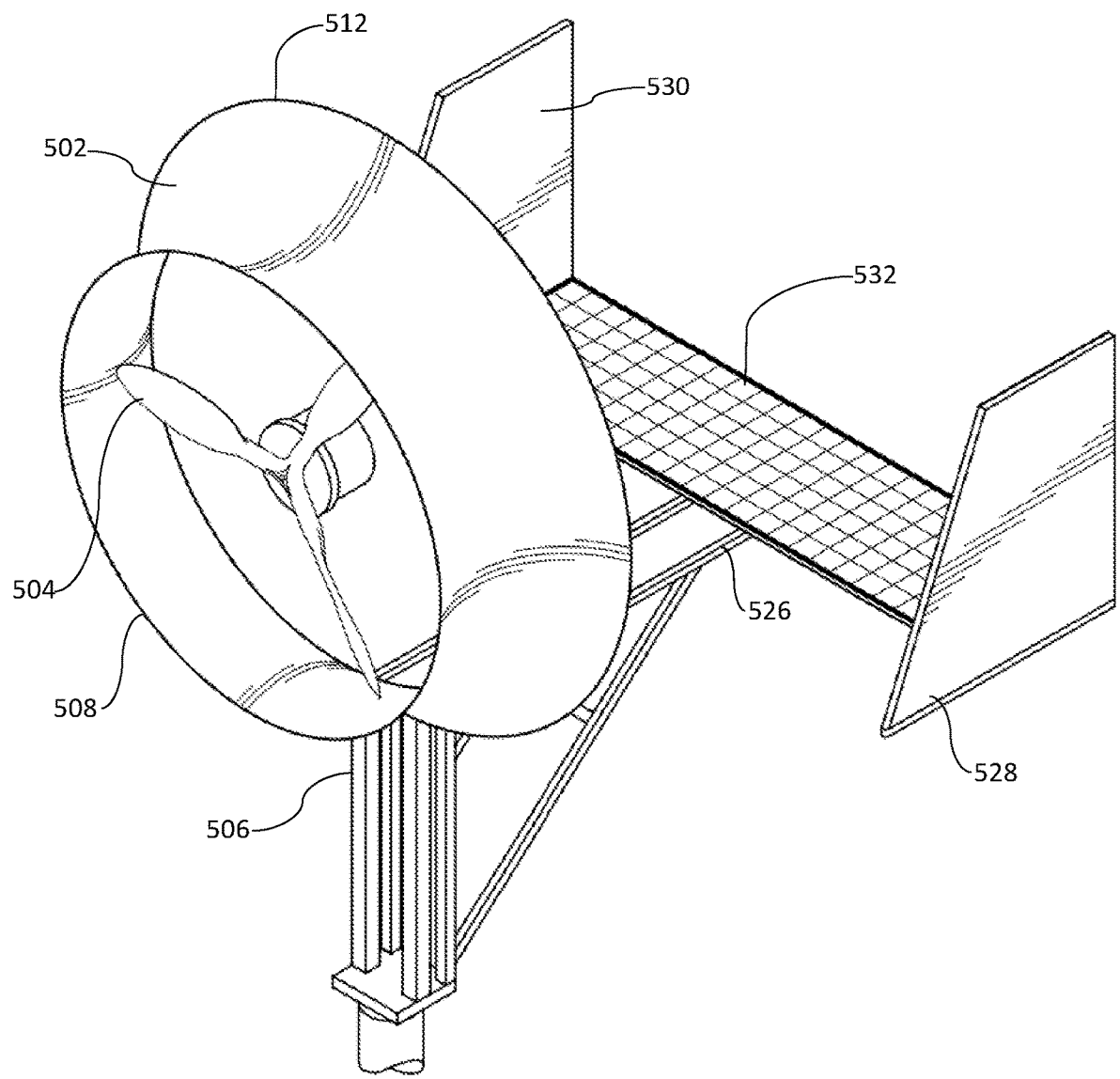
FIG. 18 is a front perspective view of a funnel wind turbine comprising a solar panel.
Figure 19:
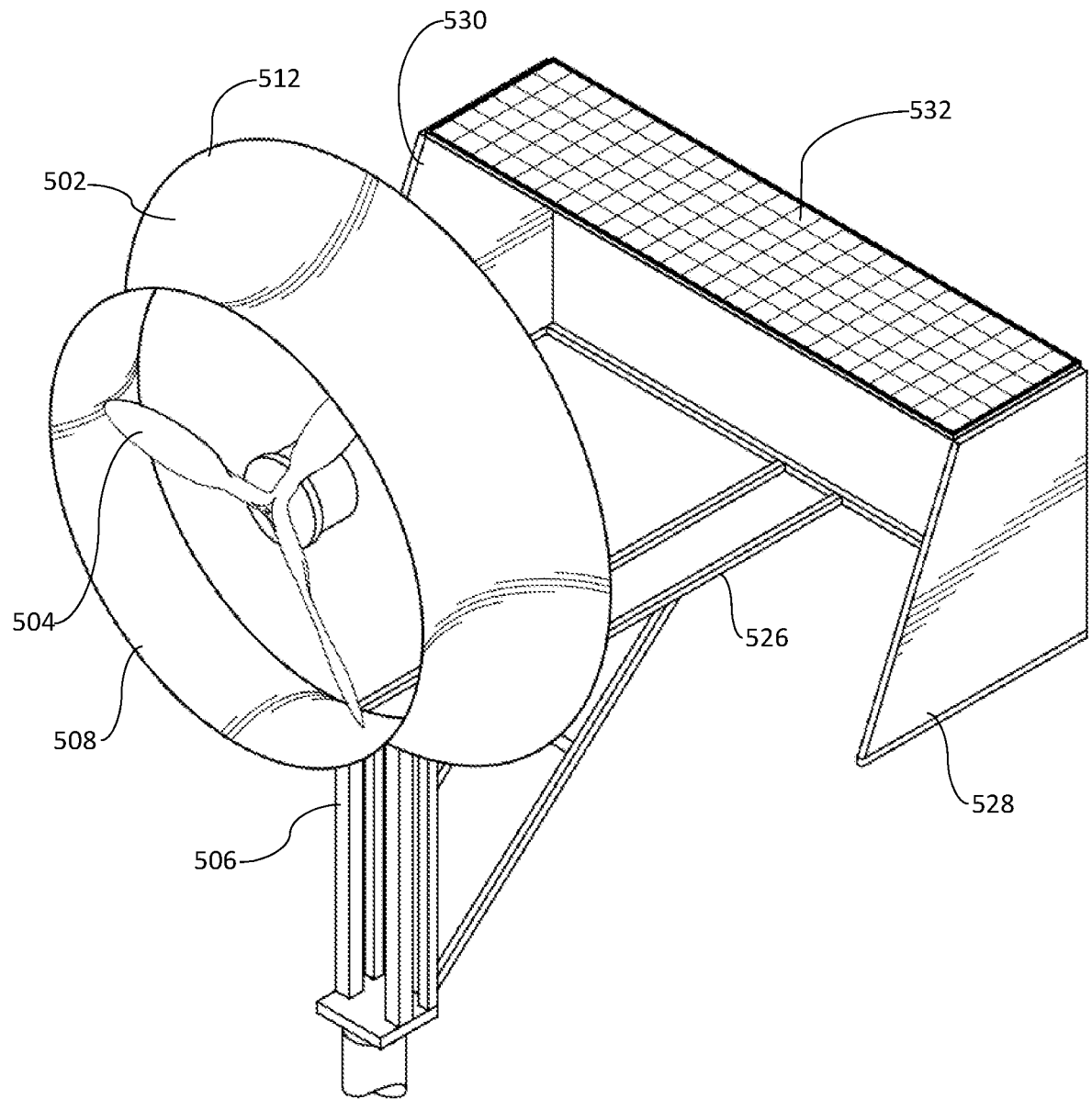
FIG. 19 is a front perspective view of a funnel wind turbine comprising a solar panel.

As further illustrated, a tail frame 526 may comprise fins 528, 530 to aid in rotating the funnel wind turbine 500 to optimal winds. Combined with the distance 524 of the funnel 502, the accuracy is enhanced. Further, as shown in FIGS. 18-19, a solar panel 532 may be coupled to the funnel wind turbine 500, such as on the tail frame 526 (FIG. 18), on the tail fins 528, 530 (FIG. 19), or otherwise positioned. In one embodiment, the solar panel may make up portions, or all of, the funnel 502. The solar panel 532 aids in the production of electricity, allowing the funnel wind turbine 500 to produce electricity from both wind and solar simultaneously, surpassing the electricity output of the prior art.

It is appreciated from the foregoing that the funnel wind turbine described herein solves the need for a wind turbine that is highly efficient, is capable of functioning in low-wind environments, requires less space than traditional wind turbines, and that can be used in a variety of settings.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A funnel wind turbine, comprising:
a horizontal funnel comprising an inlet end having a first diameter, an outlet end having a second diameter, and a narrow portion having a third diameter, the narrow portion interposed between the inlet end and the outlet end, the third diameter being less than the first diameter, with the first diameter being less than the second diameter;
rotor blades positioned and rotatable within the third diameter of the narrow portion;
at least one tailfin; and
a solar panel.

2. The funnel wind turbine of claim 1, further comprising a fourth diameter calculated at a bend.

3. The funnel wind turbine of claim 2, wherein the bend and the outlet end are in the same vertical geometric plane.

4. The funnel wind turbine of claim 1, further comprising a support frame coupled to a support tower, the horizontal funnel coupled to the support frame, the support frame configured to rotate on the support tower.

5. A method of using the funnel wind turbine of claim 1, the method comprising positioning the intake end of the horizontal turbine to receive wind, the received wind compressing as it moves through the narrow portion, turning the rotor blades, and exiting through the outlet end; the inlet end being less in diameter than the outlet end, thereby creating negative pressure at the outlet end.

* * * * *